US012446795B2

(12) United States Patent
DeHennis et al.

(10) Patent No.: US 12,446,795 B2
(45) Date of Patent: Oct. 21, 2025

(54) ENCLOSURE FOR A WIRELESS IMPLANTABLE DEVICE WITH EMBEDDED POWER SOURCE

(71) Applicant: Senseonics, Incorporated, Germantown, MD (US)

(72) Inventors: Andrew DeHennis, Germantown, MD (US); Abhi Chavan, Germantown, MD (US); James Masciotti, Germantown, MD (US); Bryan Hays, Germantown, MD (US); Yahya Hosseini, Germantown, MD (US); Erman Citirik, Germantown, MD (US)

(73) Assignee: Senseonics, Incorporated, Germantown, MD (US)

(*) Notice: Subject to any disclaimer, the term of this patent is extended or adjusted under 35 U.S.C. 154(b) by 732 days.

(21) Appl. No.: 17/211,251

(22) Filed: Mar. 24, 2021

(65) Prior Publication Data

US 2021/0298634 A1    Sep. 30, 2021

Related U.S. Application Data

(60) Provisional application No. 62/994,809, filed on Mar. 25, 2020.

(51) Int. Cl.
*A61B 5/07*   (2006.01)
*A61B 5/00*   (2006.01)
*A61B 5/145*  (2006.01)

(52) U.S. Cl.
CPC .............. *A61B 5/076* (2013.01); *A61B 5/686* (2013.01); *A61B 5/14503* (2013.01); *A61B 2562/12* (2013.01)

(58) Field of Classification Search
CPC ..... A61B 5/686; A61B 5/076; A61B 5/14503; A61B 2562/12; A61B 5/6861;
(Continued)

(56) References Cited

U.S. PATENT DOCUMENTS 5,535,752 A   7/1996  Halperin et al.
6,011,993 A   1/2000  Tziviskos et al.
(Continued)

FOREIGN PATENT DOCUMENTS

EP    2401011 B1    8/2019
JP    H09-505508 A  6/1997
(Continued)

*Primary Examiner* — Livius R. Cazan
(74) *Attorney, Agent, or Firm* — Rothwell, Figg, Ernst & Manbeck, P.C.

(57) ABSTRACT

An implantable device including a housing, circuitry within the housing, and a power source attached to the housing and electrically connected to the circuitry. The device may include electrically conductive connectors configured to electrically connect positive and negative terminals of the power source to the circuitry. The device may include a power source terminal enclosure attached to the power source and configured to enclose the positive and negative terminals of the power source. The power source terminal enclosure may include holes through which the electrically conductive connectors pass. The device may include a housing cap enclosure attached to the power source terminal enclosure and to an open end of the housing. The housing cap enclosure may enclose the circuitry within the housing and includes passages through which the electrically conductive connectors pass.

30 Claims, 7 Drawing Sheets

(58) Field of Classification Search
CPC ...... A61B 5/6864; A61B 5/6867–6878; H05K 5/062; H05K 5/064; A01K 11/006; A01K 11/007

See application file for complete search history.

(56) References Cited

U.S. PATENT DOCUMENTS

| | | | |
|---|---|---|---|
| 6,185,452 | B1 | 2/2001 | Schulman et al. |
| 6,269,266 | B1 | 7/2001 | Leysieffer |
| 6,338,657 | B1 | 1/2002 | Harper et al. |
| 7,162,289 | B2 | 1/2007 | Shah et al. |
| 7,552,522 | B2 | 6/2009 | Shah et al. |
| 7,912,525 | B2 | 3/2011 | Shah et al. |
| 9,423,635 | B1 | 8/2016 | Cameron et al. |
| 10,434,316 | B2 | 10/2019 | Kelley et al. |
| 10,576,305 | B2 | 3/2020 | Marharbiz et al. |
| 11,589,748 | B2 | 2/2023 | Marharbiz et al. |
| 11,607,128 | B2 | 3/2023 | Marharbiz et al. |
| 12,239,408 | B2 | 3/2025 | Marharbiz et al. |
| 12,268,463 | B2 | 4/2025 | Marharbiz et al. |
| 2005/0043769 | A1* | 2/2005 | Gramse ............... A61N 1/375 607/36 |
| 2005/0245983 | A1 | 11/2005 | Kast et al. |
| 2008/0109044 | A1 | 5/2008 | Gramse et al. |
| 2009/0054952 | A1 | 2/2009 | Clukhovsky et al. |
| 2017/0007836 | A1* | 1/2017 | Nassif ............... A61N 1/36125 |
| 2017/0135225 | A1* | 5/2017 | Chang ............... A61N 1/3605 |
| 2017/0325741 | A1* | 11/2017 | Lim ............... A61B 5/686 |
| 2019/0232066 | A1 | 8/2019 | Lim et al. |

FOREIGN PATENT DOCUMENTS

| | | | |
|---|---|---|---|
| JP | 2002-280119 | A | 9/2002 |
| JP | 2006-501021 | A | 1/2006 |
| JP | 2017-136331 | A | 8/2017 |
| JP | 2017-527426 | A | 9/2017 |
| JP | 2019-524224 | A | 9/2019 |
| JP | 2019-527568 | A | 10/2019 |
| WO | WO 8800135 | A1 * | 1/1988 |
| WO | 2010/138294 | A1 | 12/2010 |
| WO | 2018/140623 | A1 | 8/2018 |
| WO | 2018/232350 | A1 | 12/2018 |
| WO | 2020/041240 | A1 | 2/2020 |
| WO | 2020/043819 | A1 | 3/2020 |

\* cited by examiner

ENCLOSURE FOR A WIRELESS IMPLANTABLE DEVICE WITH EMBEDDED POWER SOURCE

CROSS-REFERENCE TO RELATED APPLICATION

The present application claims the benefit of priority to U.S. Provisional Application Ser. No. 62/994,809, filed on Mar. 25, 2020, which is incorporated herein by reference in its entirety.

BACKGROUND

Field of Invention

The present invention relates generally to analyte monitoring and to implantable devices including a power source.

Discussion of the Background

An implantable sensor that has no charge storage device may rely exclusively on an external device for operational power (e.g., to operate its circuitry for making measurements and conveying the data to the external device). The sensor and the external device may each include an inductive element (e.g., coil). The sensor may receive power from the external device when the external device uses its inductive element to generate an electrodynamic field and the inductive elements of the sensor and external device are magnetically coupled within the electrodynamic field. However, with no internal power source, the sensor is dormant if the sensor is not located in the proximity of the external device (i.e., if the inductive elements of the sensor and the external device are not coupled within the electrodynamic field generated by the external device).

For instance, the sensor having no charge storage device may be implanted in the arm of a human patient, and the sensor may be located in the proximity of the external device when the human patient wears an armband having the external device therein. The sensor would be able to take analyte measurements and convey data to the external device while the patient is wearing the armband, but the sensor would not be able to take analyte measurements while the patient was not wearing the armband (e.g., because the human patient is swimming or showering), and the result would be a gap in analyte measurement information.

Accordingly, there is a need for an improved sensor and methods for using the same that improve the ability of the sensor to take analyte measurements.

SUMMARY

One aspect of the invention may provide an implantable device including a housing, circuitry, a power source, electrically conductive connectors, a power source terminal enclosure, and a housing cap enclosure. The power source may be attached to the housing. The power source may include positive and negative terminals electrically connected to the circuitry. The electrically conductive connectors may be configured to electrically connect the positive and negative terminals of the power source to the circuitry. The power source terminal enclosure attached to the power source and configured to enclose the positive and negative terminals of the power source. The housing cap enclosure attached to the power source terminal enclosure and to an open end of the housing, wherein the housing cap enclosure encloses the circuitry within the housing.

In some embodiments, the power source terminal enclosure may include holes through which the electrically conductive connectors pass. In some embodiments, the housing cap enclosure may include passages through which the electrically conductive connectors pass. In some embodiments, the housing cap enclosure may include passages through which one or more supports attached to and extending from the power source pass.

In some embodiments, the device may further include a spring configured to establish an electrical connection between a connector of the electrically conductive connectors and the positive terminal of the power source. In some embodiments, the power source terminal enclosure may enclose the spring.

In some embodiments, the device may further include one or more supports attached to and extending from the power source, and the one or more supports may be configured to support the attachment of the power source to the housing. In some embodiments, the one or more supports may have a larger diameter than a diameter of the electrically conductive connectors. In some embodiments, the supports may be made from a material that is not electrically conductive. In some embodiments, the power source terminal enclosure may include holes through which the supports pass. In some embodiments, the housing cap enclosure may include passages through which the supports pass.

In some embodiments, the device may further include one or more substrates within the housing, and the circuitry may include one or more circuit components mounted on or fabricated in the one or more substrates. In some embodiments, the one or more circuit components may include one or more light sources and one or more photodetectors.

In some embodiments, the circuitry may include an inductive element. In some embodiments, the inductive element may include a conductor and a magnetic core. In some embodiments, the device may further include one or more analyte indicators on or in a portion of an exterior surface of the housing. In some embodiments, the power source may be a battery. In some embodiments, the device may be hermetically sealed. In some embodiments, the implantable device may further include a drug-eluting polymer matrix covering at least a portion of the power source terminal enclosure and/or the housing cap enclosure.

Another aspect of the invention may provide a method of manufacturing an implantable device. The method may include placing circuitry within a housing. The method may include, after placing the circuitry in the housing, filling the housing with an epoxy to an initial epoxy fill line. The method may include, after filling the housing with the epoxy to the initial epoxy fill line, curing the epoxy. The method may include connecting electrically conductive connectors to contact pads of the circuitry. The method may include placing the electrically conductive connectors in passages of a housing cap enclosure. The method may include, after placing the electrically conductive connectors in the passages of the housing cap enclosure, filling a remaining space in the housing between the initial epoxy fill line and an end of the housing with epoxy. The method may include curing the epoxy in the remaining space in the housing between the initial epoxy fill line and an end of the housing.

In some embodiments, the method may further include placing one or more supports attached to and extending from a power source in the passages of the housing cap enclosure. In some embodiments, the method may further include connecting the electrically conductive connectors to positive and negative terminals of a power source.

In some embodiments, connecting the electrically conductive connectors to the positive and negative terminals of the power source may include pushing a spring at an end of a connector of the electrically conductive connectors against the positive terminal of the power source and compressing the spring. In some embodiments, after placing the electrically conductive connectors in the passages of the housing cap enclosure, a surface of the housing cap enclosure abuts a power source terminal enclosure that is attached to a power source and encloses positive and negative terminals of the power source.

Yet another aspect of the invention may provide an implantable device including a housing, circuitry at least partially within the housing, a power source, first and second electrically conductive connectors, and a coupler. The power source may include positive and negative terminals electrically connected to the circuitry. The first electrically conductive connector may be configured to electrically connect the positive terminal of the power source to the circuitry. The second electrically conductive connector may be configured to electrically connect the negative terminal of the power source to the circuitry. The coupler may be between the housing and the power source. The coupler may be attached to the power source and may include one or more supports that extend from the coupler into the housing.

In some embodiments, the coupler may include the second electrically conductive connector. In some embodiments, the one or more supports may be made from a material that is not electrically conductive. In some embodiments, the coupler may have a cylindrical portion with the one or more supports extending from the cylindrical portion.

In some embodiments, the device may include one or more substrates within the housing, and the circuitry may include one or more circuit components mounted on or fabricated in the one or more substrates. In some embodiments, the one or more circuit components may include one or more light sources and one or more photodetectors.

In some embodiments, the circuitry may include an inductive element. In some embodiments, the inductive element may include a conductor and a magnetic core. In some embodiments, the inductive element may extend into the coupler.

In some embodiments, the circuitry may include contact pads, and the device may further include bonding wires that electrically connect the first and second electrically conductive connectors to the contact pads. In some embodiments, the device may include one or more analyte indicators on or in a portion of an exterior surface of the housing. In some embodiments, the power source may be a battery. In some embodiments, the device may be hermetically sealed. In some embodiments, the device may include a spring configured to establish an electrical connection between the first electrically conductive connector and the positive terminal of the power source. In some embodiments, the implantable device may further include a drug-eluting polymer matrix covering at least a portion of the coupler.

Still another aspect of the invention may provide a method of manufacturing an implantable device. The method may include placing circuitry within a housing. The method may include, after placing the circuitry in the housing, filling the housing with an epoxy to an initial epoxy fill line. The method may include, after filling the housing with the epoxy to the initial epoxy fill line, curing the epoxy. The method may include inserting one or more supports of a coupler into the housing. The method may include, with the one or more supports of the coupler inserted into the housing, connecting first and second electrically conductive connectors to contact pads of the circuitry. The method may include attaching the coupler to a power source. The method may include filling at least a remaining space in the housing between the initial epoxy fill line and an end of the housing with epoxy. The method may include curing the epoxy in at least the remaining space in the housing between the initial epoxy fill line and an end of the housing.

In some embodiments, attaching the coupler to the power source may include connecting the first electrically conductive connector to a positive terminal of the power source. In some embodiments, connecting the first electrically conductive connector to the positive terminal of the power source may include pushing a spring at an end of the first electrically conductive connector against the positive terminal of the power source and compressing the spring.

In some embodiments, attaching the coupler to the power source may include connecting the second electrically conductive connector to a negative terminal of the power source. In some embodiments, after inserting the one or more supports of the coupler into the housing, a surface of coupler abuts a surface of the housing.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION OF PREFERRED EMBODIMENTS

Figure 1:
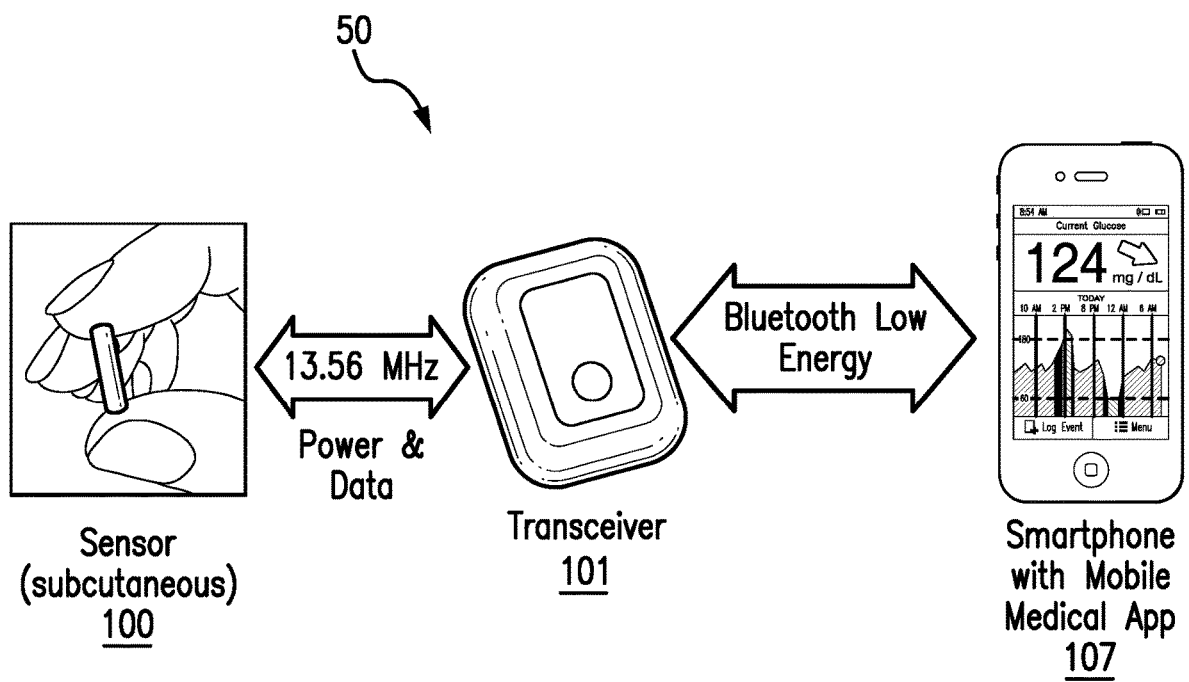
FIG. 1 is a schematic view illustrating a system embodying aspects of the present invention.

FIG. 1 is a schematic view of an exemplary system 50 embodying aspects of the present invention. In some embodiments, the system 50 may be an analyte monitoring system. In some embodiments, the system 50 may be a continuous analyte monitoring system (e.g., a continuous glucose monitoring system). In some embodiments, the system 50 may include one or more of an implantable device 100, an external device 101, and a display device 107. In some embodiments, the implantable device 100 may be an analyte sensor. In some embodiments, the implantable device 100 may be a small, fully subcutaneously implantable sensor that measures the amount or concentration of an analyte (e.g., glucose) in a medium (e.g., interstitial fluid) of a living animal (e.g., a living human). However, this is not required, and, in some alternative embodiments, the implantable device 100 may be a partially implantable (e.g., transcutaneous) device. In addition, although embodiments of the invention are described with respect to an analyte monitoring system in which the implantable device 100 is an analyte sensor, this is not required. In some alternative embodiments, the implantable device 100 is not a sensor and is instead a different type of implantable device, such as, for example and without limitation, an insulin pump, pacemaker, or electrical/heat therapy device.

In some embodiments, the external device 101 may be an externally worn device (e.g., attached via an armband, wristband, waistband, or adhesive patch). In some embodiments, the external device 101 may remotely communicate with the implantable device 100 (e.g., via near field communication (NFC)). In some embodiments, the external device 101 may communicate with the implantable device 100 to initiate and receive the measurements from the implantable device 100. In some embodiments, the external device 101 may be a transceiver. In some embodiments, the external device 101 may be a smartphone (e.g., an NFC-enabled smartphone). In some embodiments, the external device 101 may communicate information (e.g., one or more analyte measurements) wirelessly (e.g., via a Bluetooth™ communication standard such as, for example and without limitation Bluetooth Low Energy) to a hand held application running on a display device 107 (e.g., smartphone).

Figure 2A:
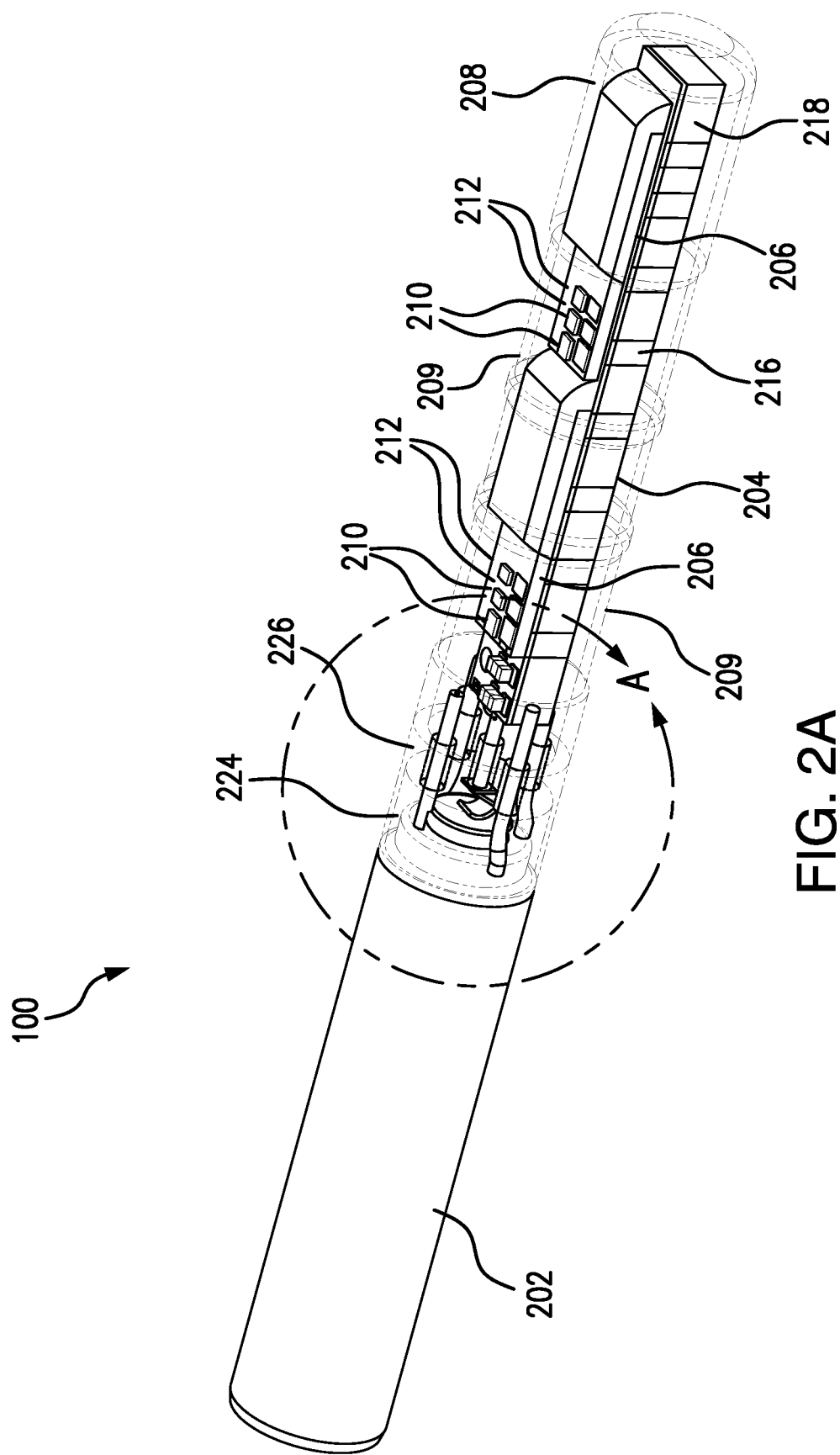
FIGS. 2A and 2B are perspective views of an implantable device and a portion of the implantable device, respectively, embodying aspects of the present invention.
Figure 2B:
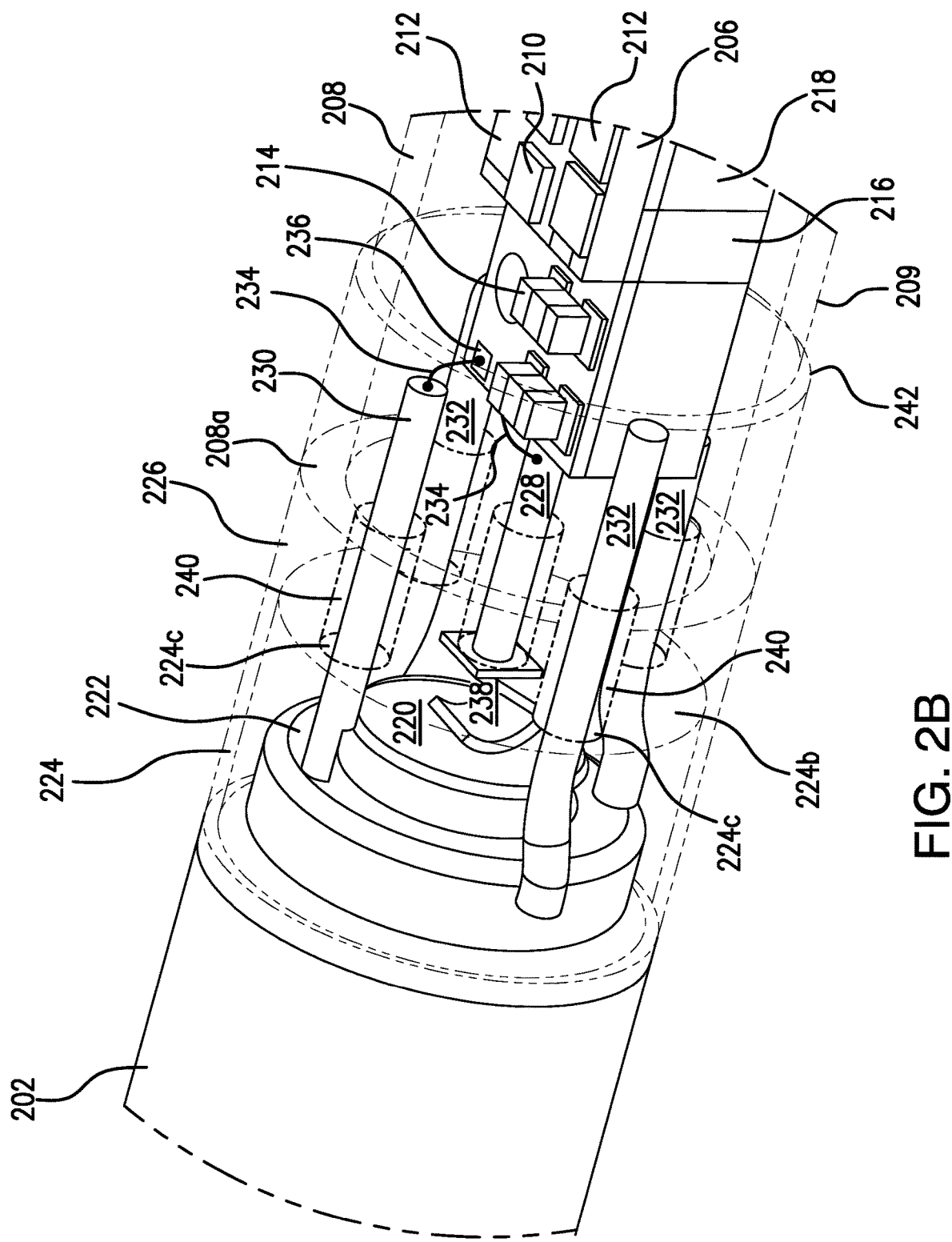
Figure 3A:
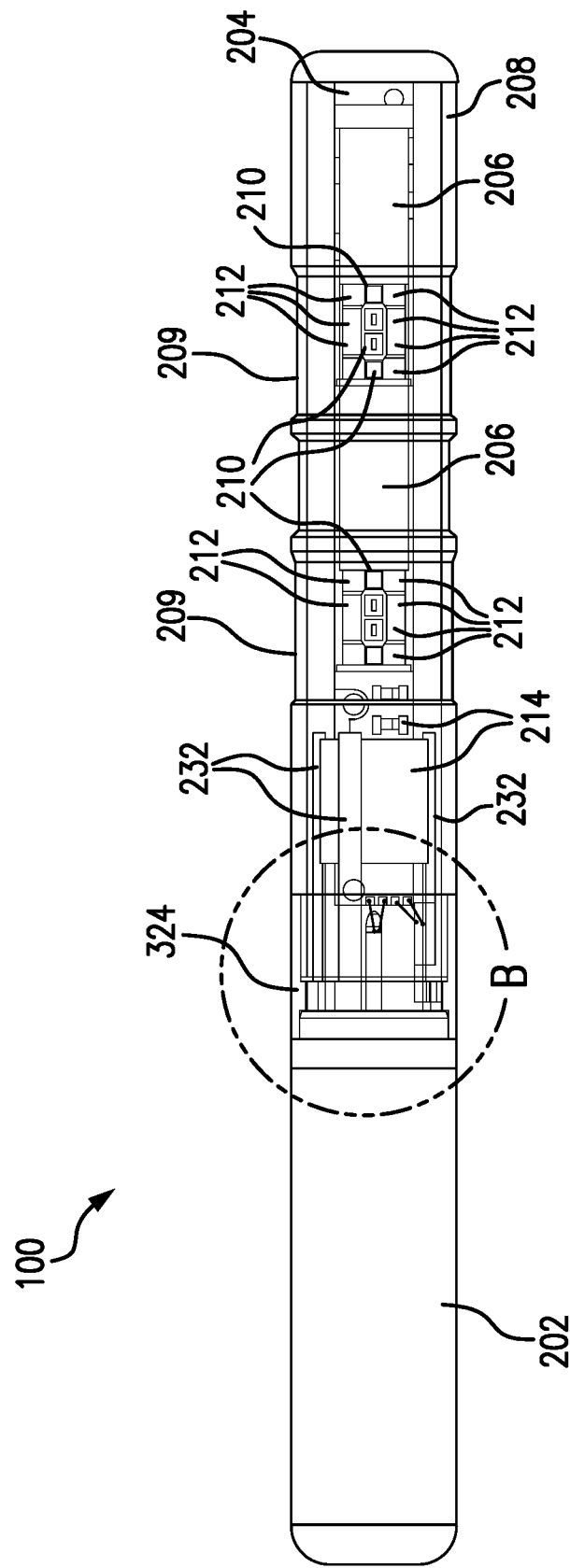
FIGS. 3A, 3B, and 3E are side views of an implantable device a portion of the implantable device, respectively, embodying aspects of the present invention.
Figure 3B:
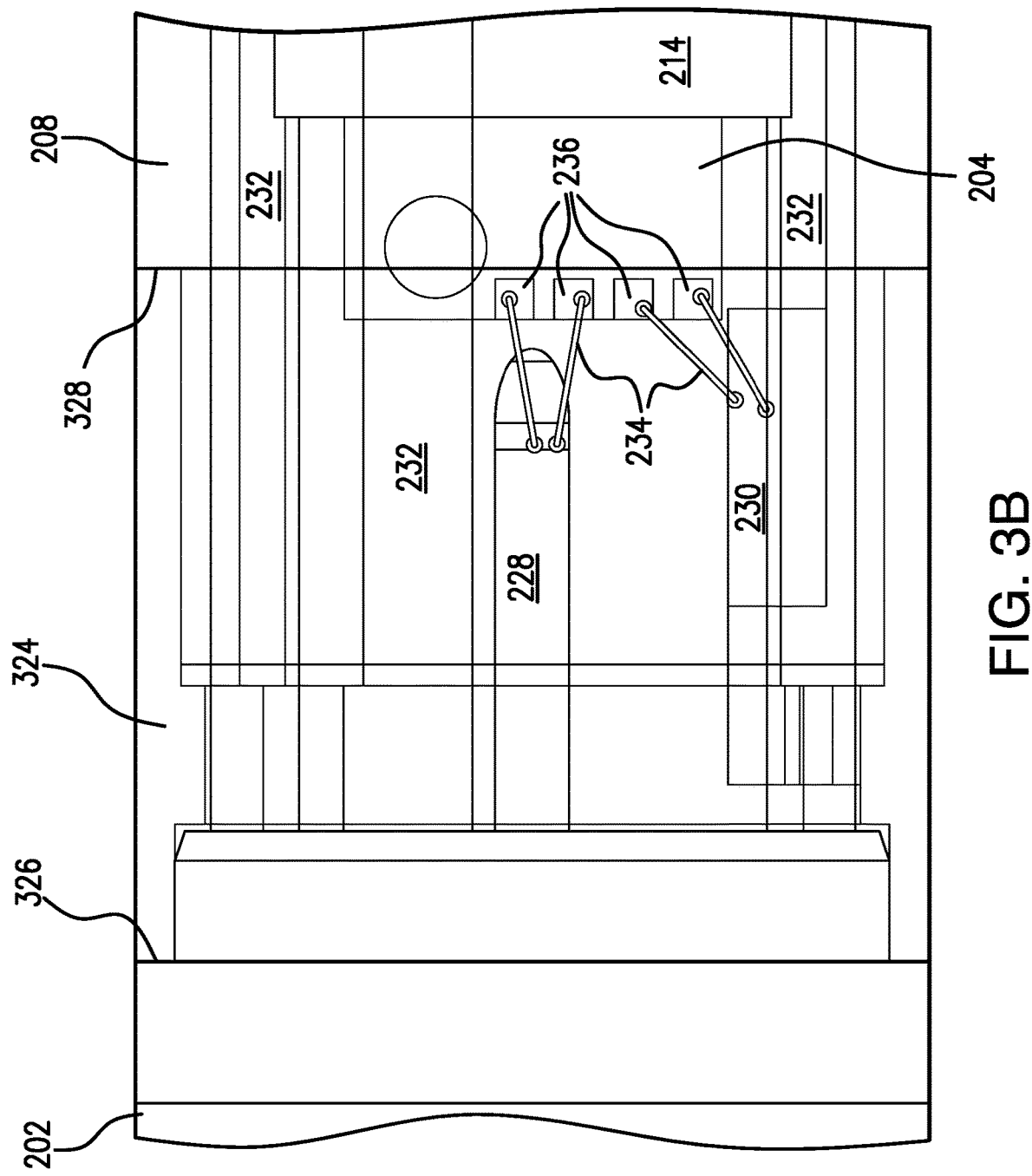

FIG. 2A is a perspective view of an implantable device 100 of the system 50 according to some embodiments. FIG. 2B is a perspective view of portion A of the implantable device 100 as shown in FIG. 2A. FIG. 3A is a side view of an implantable device 100 of the system 50 according to some alternative embodiments. FIG. 3B is a side view of portion B of the implantable device 100 as shown in FIG. 3A. In some embodiments, the implantable device 100 may be a wireless analyte sensor. In some embodiments, the implantable device 100 may be an analyte sensor. In some embodiments, the analyte sensor may detect the presence, amount, and/or concentration of an analyte (e.g., glucose, oxygen, cardiac markers, low-density lipoprotein (LDL), high-density lipoprotein (HDL), or triglycerides). In some embodiments, the implantable device 100 may be an optical sensor (e.g., fluorometers). In some embodiments, the implantable device 100 may be a chemical or biochemical sensor.

In some embodiments, as shown in FIGS. 2A, 2B, 3A, and 3B, the implantable device 100 may include a power source 202, an inductive element 204, one or more substrates 206, and/or a housing 208. In some embodiments, the housing 208 may be a body, shell, capsule, or encasement. In some embodiments, the housing 208 may be rigid and/or biocompatible. In some embodiment, the housing 208 may include a polymer (e.g., PMMA) sleeve or a silicon tube. However, this is not required, and, in other embodiments, different materials and/or shapes may be used for the housing 208.

In some embodiments, the implantable device 100 may include one or more analyte indicators (e.g., analyte indicators 334 in FIG. 3E), such as, for example, a polymer graft or hydrogel coated, diffused, adhered, embedded, or grown on or in at least a portion of the exterior surface of the housing 208. In some embodiments, as shown in FIGS. 2A and 3A, the housing 208 may include one or more cutouts or recesses 209, and the one or more analyte indicators may be located (partially or entirely) in the cutouts or recesses 209. In some embodiments, the one or more analyte indicators may be porous and may allow the analyte (e.g., glucose) in a medium (e.g., interstitial fluid) to diffuse into the one or more analyte indicators.

In some embodiments, the one or more analyte indicators may exhibit one or more detectable properties (e.g., optical properties) that vary in accordance with the amount or concentration of the analyte in proximity to the one or more indicators. In some embodiments, the one or more analyte indicators may emit an amount of emission light that varies in accordance with the amount or concentration of the analyte in proximity to the one or more analyte indicators. In some embodiments, the one or more analyte indicators may include one or more analyte indicator molecules (e.g., fluorescent analyte indicator molecules), which may be distributed throughout the one or more analyte indicators. In some embodiments, the one or more analyte indicators may be a phenylboronic-based analyte indicators. However, a phenylboronic-based analyte indicator is not required, and, in some alternative embodiments, the implantable device 100 may include a different analyte indicator, such as, for example and without limitation, a glucose oxidase-based indicator, a glucose dehydrogenase-based indicator, or a glucose binding protein-based indicator.

In some embodiments, as shown in FIGS. 2A and 3A, the implantable device 100 may include one or more light sources 210 that emit excitation light over an excitation wavelength range. In some embodiments, the excitation wavelength range may be a range of wavelengths that interact with an analyte indicator (e.g., one or more of analyte indicators 334 of FIG. 3E). In some embodiments, the excitation light may be ultraviolet (UV) light.

In some embodiments, as shown in FIGS. 2A and 3A, the implantable device 100 may include one or more photodetectors 212 (e.g., photodiodes, phototransistors, photoresistors, or other photosensitive elements). In some embodiments, the one or more photodetectors 212 may be configured to detect a detectable property of an analyte indicator and output an analyte signal indicative of the amount or concentration of the analyte in the medium within the living animal. In some embodiments, the one or more photodetectors 212 may be configured to output an analyte signal indicative of an amount of the emission light (e.g., fluorescent light) received by the one or more photodetectors 212.

In some embodiments, as shown in FIGS. 2A, 2B, 3A, and 3B, the implantable device 100 may include one or more substrates 206 on one side of the inductive element 204. In some embodiments, although not shown in FIGS. 2A, 2B, 3A, and 3B, the implantable device 100 may additionally include one or more substrates 206 on an opposite side of the inductive element 204. In some embodiments, one or more substrates 206 may be a circuit board (e.g., a printed circuit board (PCB) or flexible PCB) on which one or more of circuit components (e.g., analog and/or digital circuit components) may be mounted or otherwise attached. However, in some alternative embodiments, one or more substrates 206 may be a semiconductor substrate.

In embodiments where a substrate 206 is a semiconductor substrate, the substrate 206 may have one or more of circuit components fabricated therein. For instance, the fabricated circuit components may include analog and/or digital circuitry. Also, in some embodiments in which a substrate 206 is a semiconductor substrate, in addition to the circuit components fabricated in the semiconductor substrate, circuit components may be mounted or otherwise attached to the semiconductor substrate. In other words, in some semiconductor substrate embodiments, a portion or all of the circuit components, which may include discrete circuit elements, an integrated circuit (e.g., an application specific integrated circuit (ASIC)) and/or other electronic components (e.g., a non-volatile memory), may be fabricated in the semiconductor substrate with the remainder of the circuit components is secured to the semiconductor substrate, which may provide communication paths between the various secured components.

In some embodiments, as shown in FIGS. 2A and 3A, one or more of the light sources 210 may be mounted on or fabricated within the one or more substrates 206. In some embodiments, one or more of the photodetectors 212 may be mounted on or fabricated in the one or more substrates 206. In some embodiments, one or more light sources 210 may be mounted on one or more substrates 206, one or more photodetectors 212 may be fabricated within one or more substrates 206, and all or a portion of the circuit components may be fabricated within the one or more substrates 206. In some embodiments, as shown in FIGS. 2B, 3A, and 3B, the implantable device 100 may additionally or alternatively have one or more circuit components 214 (e.g., capacitors) mounted to the inductive element 204.

In some embodiments, the implantable device 100 may communicate with the external device 101. In some embodiments, the external device 101 may be an electronic device that communicates with the implantable device 100 to provide commands (e.g., measurement commands) to the implantable device 100 and/or receive measurement data (e.g., photodetector and/or temperature sensor readings) from the implantable device 100. The measurement data may include one or more readings from one or more photodetectors 212 of the implantable device 100 and/or one or more readings from one or more temperature sensors of the implantable device 100. In some embodiments, the external device 101 may calculate analyte concentrations from the measurement data received from the implantable device 100. However, it is not required that the external device 101 perform the analyte concentration calculations itself, and, in some alternative embodiments, the external device 101 may instead convey/relay the measurement data received from the implantable device 100 to another device for calculation of analyte concentrations. In other alternative embodiments, the implantable device 100 may perform the analyte concentration calculations.

In some embodiments, the inductive element 204 of the implantable device 100 may act an antenna. In some embodiments, the external device 101 may implement a passive telemetry for communicating with the implantable device 100 via an inductive magnetic link for data transfer. In some embodiments, the inductive element 204 may be, for example, a ferrite based micro-antenna. In some embodiments, as shown in FIG. 2A, the inductive element 204 may include a conductor 216 in the form of a coil and a magnetic core 218. In some embodiments, the core 218 may be, for example and without limitation, a ferrite core. In some embodiments, the inductive element 204 may be connected to circuitry (e.g., an application specific integrated circuit (ASIC)) of the implantable device 100. In some embodiments, the implantable device 100 may rely on the external device 101 to provide a data link to convey data from the implantable device 100 to the external device 101.

In some embodiments, circuitry of the implantable device 100 may include the inductive element 204, the circuit components mounted on or fabricated in the one or more substrates 206 (e.g., the one or more light sources 210 and/or the one or more photodetectors 212), and/or the one or more circuit components 214 mounted to the inductive element 204. In some embodiments, the circuitry of the implantable device 100 may be powered by the power source 202.

In some embodiments, the power source 202 may be a charge storage device. In some embodiments, the power source 202 may be a battery (e.g., a rechargeable battery such as a lithium-ion battery), a capacitor, or a super capacitor. In some embodiments, at least the exterior of the power source 202 may be made of a biocompatible material such as, for example and without limitation, stainless steel or a titanium alloy. In some embodiments, the power source 202 may include a positive terminal (cathode) 220 and a negative terminal (anode) 222.

In some embodiments, as shown in FIGS. 2A, 2B, 3A, and 3B, one or more couplers may attach the power source 202 to the housing 208. In some embodiments, as shown in FIGS. 2A and 2B, the one or more couplers that attach the power source 202 to the housing 208 may include a power source terminal enclosure 224 and a housing cap enclosure 226. In some embodiments, electrically conductive connectors 228 and 230 may electrically connect the positive and negative terminals 220 and 222, respectively, of the power source 202 to the circuitry of the implantable device 100. In some embodiments, the attachment of the power source 202 to the housing 208 may be supported by one or more supports 232. In some embodiments, as shown in FIG. 2A, the circuitry of the implantable device 100 may extend away from the power source 202 along the longitudinal axis of the power source.

In some embodiments, the electrically conductive connectors 228 and 230 may be rods or beams including or made out of a conductive material. In some embodiments, a bonding wires 234 may electrically connect the electrically conductive connectors 228 and 230 to contact pads 236 on the inductive element 204. In some embodiments, a spring 238 (e.g., a V-shaped spring) may be attached (e.g., welded) to one end of the electrically conductive connector 228. In some embodiments, the spring 238 may be made of an electrically conductive material and may establish an electrical connection between the connector 228 and the positive terminal 220 of the power source 202. In some embodiments, when the housing 208 and power source 202 are brought together for attachment, the spring 238 may be pushed against the positive terminal 220 of the power source 202 and compressed.

In some embodiments, the one or more supports 232 may be reinforcement rods, bars, or beams. In some embodiments, the one or more supports 232 may be attached to and extend from the power source 202. In some embodiments, the one or more supports 232 may have a larger diameter than the electrically conductive connectors 228 and 230. In some embodiments, the one or more supports 232 may be made from a material that is not electrically conductive.

In some embodiments, as shown in FIG. 2B, the power source terminal enclosure 224 may be cup-shaped (e.g., a hollow cylinder with a flat bottom 224b and an open top). However, other shapes (e.g., a hollow rectangular prism with a flat bottom and an open top) may be used in alternative embodiments. In some embodiments, the power source terminal enclosure 224 may enclose the positive and negative terminals 220 and 222 of the power source 202. In some embodiments, the power source terminal enclosure 224 may enclose the spring 238. In some embodiments, the bottom 224b of the power source terminal enclosure 224 may have holes 224c through which the electrically conductive connectors 228 and 230 and the one or more supports 232 pass. In some embodiments, the power source terminal enclosure 224 may be made of a biocompatible material. In some embodiments, the power source terminal enclosure 224 may be made of a biocompatible metal such as, for example and without limitation, stainless steel or titanium. In some embodiments, the power source terminal enclosure 224 may be attached (e.g., welded) to the power source 202. In some embodiments, the power source terminal enclosure 224 may be attached to the power source 202 by laser welding.

In some embodiments, the housing cap enclosure 226 may have a solid cylindrical shape. However, other shapes (e.g., a solid rectangular prism shape) may be used in alternative embodiments. In some embodiments, the housing cap enclosure 226 may be made of a biocompatible material such as, for example and without limitation, glass or ceramic. In some embodiments, the housing cap enclosure 226 may include passages or feedthroughs 240 through which the electrically conductive connectors 228 and 230 and the one or more supports 232 pass. In some embodiments, the housing cap enclosure 226 may include a first flat surface that abuts and is attached to the bottom 224b of the power source terminal enclosure 224. In some embodiments, the housing cap enclosure 226 may be attached to the bottom 224b of the power source terminal enclosure 224 by brazing. In some embodiments, the housing cap enclosure 226 may include a first flat surface that abuts and is attached to an open end 208a of the housing 208. In some embodiments, the housing cap enclosure 226 may enclose the circuitry of the implantable device 100 in the housing 208.

In some embodiments, after the circuitry of the implantable device 100 is placed in the housing 208, the housing 208 may be filled with an epoxy to the initial epoxy fill line 242. In some embodiments, epoxy may create a transmissive optical cavity within the housing 208. In some embodiments, the transmissive optical cavity may be formed from a suitable, optically transmissive polymer material, such as, for example, acrylic polymers (e.g., polymethylmethacrylate (PMMA)). However, this is not required, and, in other embodiments, different materials may be used for the transmissive optical cavity.

In some embodiments, after the housing 208 has been filled with an epoxy to the initial epoxy fill line 242, the epoxy may be cured. In some embodiments, the electrically conductive connectors 228 and 230 may be connected to the contact pads 236 of the circuitry of the implantable device 100 (e.g., by soldering the bonding wires 234 to the contact pads 236). In some embodiments, after the electrically conductive connectors 228 and 230 and the one or more supports 232 are in place in the passages or feedthroughs 240 of the housing cap enclosure 226, the remaining space in the housing 208 between the initial epoxy fill line 242 and the open end 208a of the housing 208 is filled with epoxy, which is then cured.

In some embodiments, the implantable device 100 including the power source 202, the power source terminal enclosure 224, the housing cap enclosure 226, and the housing 208 may be hermetically sealed.

In some alternative embodiments, as shown in FIGS. 3A and 3B, a coupler 324 may attach the housing 208 and the power source 202. In some embodiments, the coupler 324 may be between the housing 208 and the power source 202. In some embodiments, the implantable device 100 including the power source 202, the coupler 324, and the housing 208 may be hermetically sealed. In some embodiments, as shown in FIG. 3B, the implantable device 100 may include first and second electrically conductive connectors 228 and 230. In some embodiments, the first electrically conductive connector 228 may be configured to electrically connect the positive terminal 220 of the power source 202 to the circuitry. In some embodiments, the second electrically conductive connector 230 may be configured to electrically connect the negative terminal 222 of the power source 202 to the circuitry. In some embodiments, as shown in FIG. 3B, the coupler 324 may include a flat surface 326 that abuts the power source 202. In some embodiments, the coupler 324 may be attached to the power source 202 (e.g., by laser welding). In some embodiments, as shown in FIG. 3A, the circuitry of the implantable device 100 may extend away from the power source 202 along the longitudinal axis of the power source 202.

In some embodiments, the first electrically conductive connector 228 may be a rod or beam including or made out of a conductive material. In some embodiments, the second electrically conductive connector 230 may include a conductive material (e.g., a gold plating). In some embodiments, bonding wires 234 may electrically connect the first and second electrically conductive connectors 228 and 230 to contact pads 236 of the circuitry (e.g., contact pads 236 on the inductive element 204). In some embodiments, as shown in FIG. 3B, one or both of the first and second electrically conductive connectors 228 and 230 not extend from the coupler 324 and may instead be contained with the coupler 324. However, this is not required, and, in some alternative embodiments, the one or both of the first and second electrically conductive connectors 228 and 230 may extend from the coupler 324 into the housing 208. In some embodiments, as shown in FIG. 3B, the inductive element 204 may extend into the coupler 324.

In some embodiments, a spring (e.g., a V-shaped spring such as the spring 238 illustrated in FIG. 2B) may be attached (e.g., welded) to one end of the electrically conductive connector 228. In some embodiments, the spring 238 may be made of an electrically conductive material and may establish an electrical connection between the connector 228 and the positive terminal 220 of the power source 202. In some embodiments, when the housing 208 and power source 202 are brought together for attachment, the spring 238 may be pushed against the positive terminal 220 of the power source 202 and compressed.

Figure 3C:
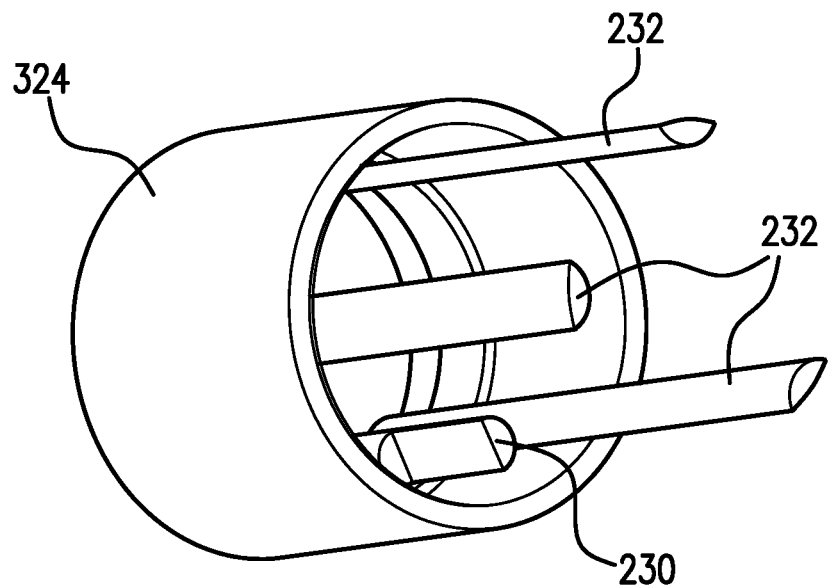
FIG. 3C and FIG. 3D are perspective and cross-sectional views, respectively, of a coupler configured to attach a housing and a power source of an implantable device embodying aspects of the present invention.
Figure 3D:
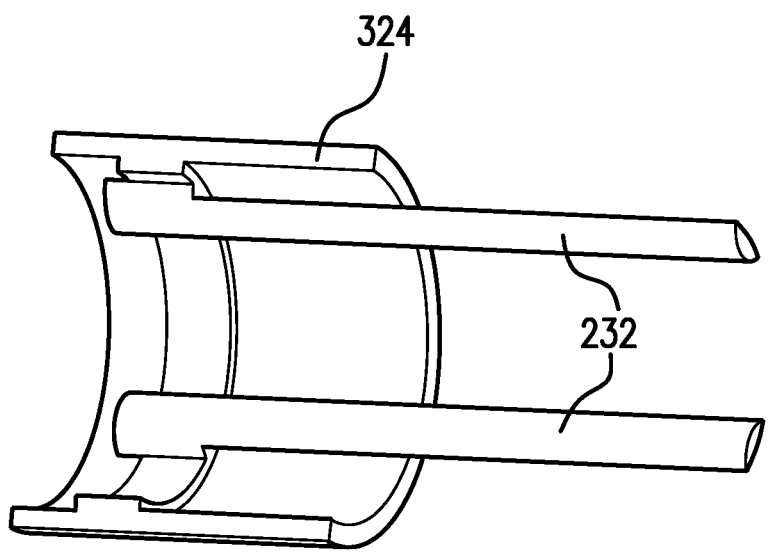

FIG. 3C and FIG. 3D are perspective and cross-sectional views, respectively, of the coupler 324 according to some embodiments. In some embodiments, as shown in FIGS. 3B-3D, the coupler 324 may include one or more supports 232. In some embodiments, the one or more supports 232 may be reinforcement rods, bars, or beams. In some embodiments, the one or more supports 232 may be attached to and/or integral with the coupler 324. In some embodiments, the one or more supports 232 may be made from a material that is not electrically conductive. Although the coupler 324 of the illustrated embodiment include three supports 232, this is not required, and, in some alternative embodiments, the coupler 324 may include more or fewer supports 232 (e.g., one, two, four, five, six, or ten supports 232). In some embodiments, as shown in FIGS. 3A and 3B, the one or more supports 232 may extend from the coupler 324 into the housing 208.

In some embodiments, as shown in FIGS. 3B-3D, the coupler 324 may include the second electrically conductive connector 230. In some embodiments, as shown in FIG. 3C, the coupler may have a cylindrical portion with the one or more supports 232 extending from the cylindrical portion. In some embodiments, as shown in FIG. 3B, the coupler 324 may include a flat surface 328 that abuts the housing 208. In some embodiments, the coupler 324 and housing 208 may be held together (e.g., by cured epoxy within the housing 208 and/or the coupler 324).

In some embodiments, a process of manufacturing the implantable device 100 may include placing circuitry (e.g., circuitry including the inductive element 204, circuit elements mounted on the inductive element 204, and/or circuit elements mounted on or fabricated in one or more substrates 206) at least partially within the housing 208. The process may include, after placing the circuitry at least partially within the housing 208, filling the housing 208 with an epoxy to an initial epoxy fill line. In some embodiments, the initial epoxy fill line may be such that the contact pads 236 are not exposed and not covered by the epoxy. In some embodiments, the initial epoxy fill line may additionally or alternatively be such that, after the epoxy is cured, there will still be space in the housing 208 for insertion of the one or more supports 232 into the housing 208.

In some embodiments, the process may include, after filling the housing with the epoxy to the initial epoxy fill line, curing the epoxy. In some embodiments, cured epoxy may create a transmissive optical cavity within the housing 208. In some embodiments, the transmissive optical cavity may be formed from a suitable, optically transmissive polymer material, such as, for example, acrylic polymers (e.g., polymethylmethacrylate (PMMA)). However, this is not required, and, in other embodiments, different materials may be used for the transmissive optical cavity.

In some embodiments, the process may include inserting the one or more supports 232 of the coupler 324 into the housing 208 (e.g., into the remaining space of the housing 208 not filled with the cured epoxy). In some embodiments, after inserting the one or more supports 232 of the coupler 324 into the housing 208, a surface of coupler 324 may abut a surface of the housing 208.

In some embodiments, the process may include, with the one or more supports 232 of the coupler 324 inserted into the housing 208, connecting the first and second electrically conductive connectors 228 and 230 to the contact pads 236 of the circuitry (e.g., contact pads 236 on the inductive element 204). In some embodiments, the first and second electrically conductive connectors 228 and 230 may be connected to the contact pads 236 of the circuitry by soldering the bonding wires 234 to the contact pads 236.

In some embodiments, the process may include attaching the coupler 324 to the power source 202 (e.g., by laser welding with the flat surface 326 of the coupler 324). In some embodiments, attaching the coupler 324 to the power source 202 may include connecting the first electrically conductive connector 228 to a positive terminal 220 of the power source 202. In some embodiments, connecting the first electrically conductive connector 228 to the positive terminal 220 of the power source 202 may include pushing a spring (e.g., a spring 238) at an end of the first electrically conductive connector 228 against the positive terminal 220 of the power source 202 and compressing the spring 238. In some embodiments, attaching the coupler 324 to the power source 202 may include connecting the second electrically conductive connector 230 to a negative terminal 222 of the power source 202.

In some embodiments, the process may include filling at least a remaining space in the housing 208 between the initial epoxy fill line and an end of the housing 208 with epoxy. In some embodiments, the epoxy may additionally fill all or a portion of the coupler 324. In some embodiments, all or a portion of the remaining space in the housing 208 and/or all or a portion of the coupler 324 may be filled with the epoxy using a small hole in the coupler 324.

In some embodiments, the process may include curing the epoxy in at least the remaining space in the housing 208 between the initial epoxy fill line and an end of the housing 208. In some embodiments, because the one or more supports 232 of the coupler 324 were inserted into the housing 208, the cured epoxy in the remaining space and/or the coupler 324 may hold the coupler 324 and the housing 208 together.

Figure 3E:
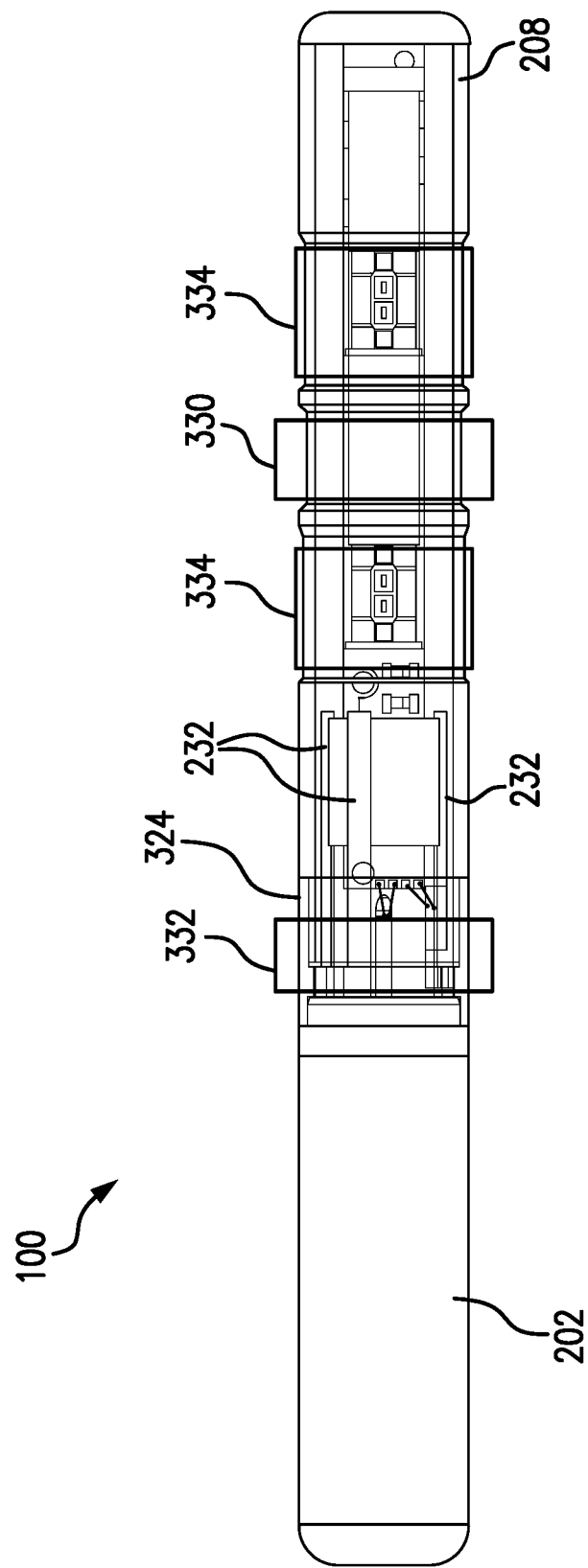

In some embodiments, the implantable device 100 may include one or more drug-eluting polymer matrices. In some embodiments, the implantable device 100 may include one or more drug-eluting polymer matrices (e.g., the drug-eluting polymer matrix 330 shown in FIG. 3E), on all or a portion of the external surface of the housing 208. In some embodiments, the one or more drug-eluting polymer matrices on the housing 208 may be located in one or more recesses in the housing 208. In some embodiments, the implantable device 100 may additionally or alternatively include one or more drug-eluting polymer matrices (e.g., the drug-eluting polymer matrix 332 shown in FIG. 3E), on all or a portion of an external surface of the one or more couplers attaching the power source 202 and the housing 208. In some embodiments, one or more drug-eluting polymer matrices may be located on all or a portion of one or both of the power source terminal enclosure 224 and the housing cap enclosure 226. In some embodiments, as shown in FIG. 3E, one or more drug-eluting polymer matrices 332 may be located on all or a portion of the coupler 324.

In some embodiments, the one or more drug-eluting polymer matrices may be applied to the sensor housing 208 and/or one or more couplers (e.g., the coupler 324 or power source terminal enclosure 224 and the housing cap enclosure 226) via dip or spray coating. In some alternative embodiments, the one or more drug-eluting polymer matrices may have a pre-formed shape such as, for example, a ring or sleeve. In some alternative embodiments, the one or more drug-eluting polymer matrices may have a different shape. In some embodiments, as shown in FIG. 3E, the one or more drug-eluting polymer matrices 330 and 332 may wrap around a portion of the sensor housing 208 and/or a portion of the coupler 324. In some alternative embodiments, the one or more drug-eluting polymer matrices 330 and 332 may be wider or narrower than the drug-eluting polymer matrices 330 and 332 illustrated in FIG. 3E.

One or more therapeutic agents may be dispersed within the one or more drug eluting polymer matrices (e.g., one or more inert polymer matrices). In some embodiments, the one or more therapeutic agents may reduce or stop the migration of neutrophils from entering the wound space and, thus, reduce or stop the production of hydrogen peroxide and fibrotic encapsulation. Accordingly, in some embodiments, the one or more therapeutic agents may reduce deterioration of the one or more analyte indicators (e.g., analyte indicators 334). In some embodiments, the one or more therapeutic agents, which may be dispersed within the drug eluting polymer matrix, may include one or more anti-inflammatory drugs, such as, for example, non-steroidal anti-inflammatory drug (e.g., acetylsalicylic acid (aspirin) and/or isobutylphenylpropanoic acid (ibuprofen)). In some non-limiting embodiments, the one or more therapeutic agents dispersed within the drug-eluting polymer matrix may include one or more glucocorticoids. In some non-limiting embodiments, the one or more therapeutic agents may include one or more of dexamethasone, triamcinolone, betamethasone, methylprednisolone, beclometasone, fludrocortisone, derivatives thereof, and analogs thereof. In some embodiments, the one or more therapeutic agents may reduce the production of hydrogen peroxide by neutrophils and macrophages.

Embodiments of the present invention have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention. For example, in some embodiments, the implantable device 100 may include a bridging material with insulation.

What is claimed is:

1. A method of manufacturing an implantable device, the method comprising:
    placing circuitry at least partially within a housing;
    after placing the circuitry at least partially within the housing, filling the housing with a first epoxy to an initial epoxy fill line;
    after filling the housing with the first epoxy to the initial epoxy fill line, curing the first epoxy;
    inserting one or more supports of a coupler into the housing;
    with the one or more supports of the coupler inserted into the housing, connecting first and second electrically conductive connectors to contact pads of the circuitry;
    attaching the coupler to a power source;
    after curing the first epoxy, filling at least a remaining space in the housing between the cured first epoxy and an end of the housing with a second epoxy; and
    curing the second epoxy in at least the remaining space in the housing between the cured first epoxy and the end of the housing.

2. The method of claim 1, wherein attaching the coupler to the power source comprises connecting the first electrically conductive connector to a positive terminal of the power source.

3. The method of claim 1, wherein attaching the coupler to the power source comprises connecting the second electrically conductive connector to a negative terminal of the power source.

4. The method of claim 1, wherein, after inserting the one or more supports of the coupler into the housing, a surface of the coupler abuts a surface of the housing.

5. A method of manufacturing an implantable device, the method comprising:
    placing circuitry at least partially within a housing;
    adding a material to the housing;
    after placing the circuitry at least partially within the housing and adding the material to the housing, curing the material;
    connecting a first electrically conductive connector to a contact pad of the circuitry; and
    connecting the first electrically conductive connector to a positive terminal of a power source, wherein:
        connecting the first electrically conductive connector to the positive terminal of the power source comprises pushing a spring at an end of the first electrically conductive connector against the positive terminal of the power source and compressing the spring between the first electrically conductive connector and the positive terminal of the power source,
        the spring is made of an electrically conductive material, and
        the spring establishes an electrical connection between the first electrically conductive connector and the positive terminal of the power source.

6. The method of claim 5, wherein the material is a first material, and the method further comprises:
    filling at least a remaining space in the housing between the cured first material and an end of the housing with a second material; and
    curing the second material.

7. The method of claim 6, further comprising:
    inserting one or more supports of a coupler into the housing; and
    attaching the coupler to the power source.

8. The method of claim 6, wherein, after inserting the one or more supports of the coupler into the housing, a surface of the coupler abuts a surface of the housing.

9. The method of claim 6, wherein the first and second materials are epoxy.

10. The method of claim 5, further comprising:
    connecting a second electrically conductive connector to a contact pad of the circuitry; and
    connecting the second electrically conductive connector to a negative terminal of the power source.

11. The method of claim 10, further comprising inserting one or more supports of a coupler into the housing, wherein the first and second electrically conductive connectors are connected to contact pads of the circuitry with the one or more supports of the coupler inserted into the housing.

12. The method of claim 5, wherein adding the material to the housing comprises filling the housing with the material to an initial fill line.

13. The method of claim 5, wherein the material is epoxy.

14. The method of claim 5, wherein the spring is welded to the end of the first electrically conductive connector.

15. The method of claim 5, wherein the compression of the spring is greater than any compression of the first electrically conductive connector.

16. A method of manufacturing an implantable device, the method comprising:
    placing circuitry at least partially within a housing;
    after placing the circuitry at least partially within the housing, filling the housing with a first epoxy to an initial epoxy fill line;
    after filling the housing with the first epoxy to the initial epoxy fill line, curing the first epoxy;
    connecting first and second electrically conductive connectors to contact pads of the circuitry;
    after curing the first epoxy, filling at least a remaining space in the housing between the cured first epoxy and an end of the housing with a second epoxy; and
    curing the second epoxy.

17. The method of claim 16, further comprising attaching a coupler to a power source.

18. The method of claim 17, wherein the cured second epoxy fills a portion of the coupler.

19. The method of claim 17, wherein the cured second epoxy fills all of the coupler.

20. A method of manufacturing an implantable device, the method comprising:
    placing circuitry at least partially within a housing;
    after placing the circuitry at least partially within the housing, filling the housing with a first material to an initial fill line;
    after filling the housing with the first material to the initial fill line, curing the first material, wherein the cured first material creates a transmissive optical cavity within the housing;
    connecting first and second electrically conductive connectors to contact pads of the circuitry;
    after curing the first material, filling at least a remaining space in the housing between the cured first material and an end of the housing with a second material; and
    curing the second material.

21. The method of claim 20, wherein the first and second materials are epoxy.

22. The method of claim 20, further comprising attaching a coupler to a power source.

23. The method of claim 22, wherein the cured second material fills a portion of the coupler.

24. The method of claim 22, wherein the cured second material fills all of the coupler.

25. A method of manufacturing an implantable device, the method comprising:
- placing circuitry at least partially within a housing;
- adding a first material to the housing;
- after placing the circuitry at least partially within the housing and adding the first material to the housing, curing the first material, wherein the cured first material creates a transmissive optical cavity within the housing;
- connecting first and second electrically conductive connectors to contact pads of the circuitry;
- after curing the first material, filling at least a remaining space in the housing between the cured first material and an end of the housing with a second material; and
- curing the second material.

26. The method of claim 25, wherein the first and second materials are epoxy.

27. The method of claim 25, further comprising attaching a coupler to a power source.

28. The method of claim 27, wherein the cured second material fills a portion of the coupler.

29. The method of claim 27, wherein the cured second material fills all of the coupler.

30. The method of claim 25, wherein adding the first material to the housing comprises filling the housing with the first material to an initial fill line.

* * * * *